March 16, 1943.  R. W. ANDREASSON  2,314,189
METHOD OF MANUFACTURING METAL CUTTING TOOLS
Filed Sept. 20, 1941
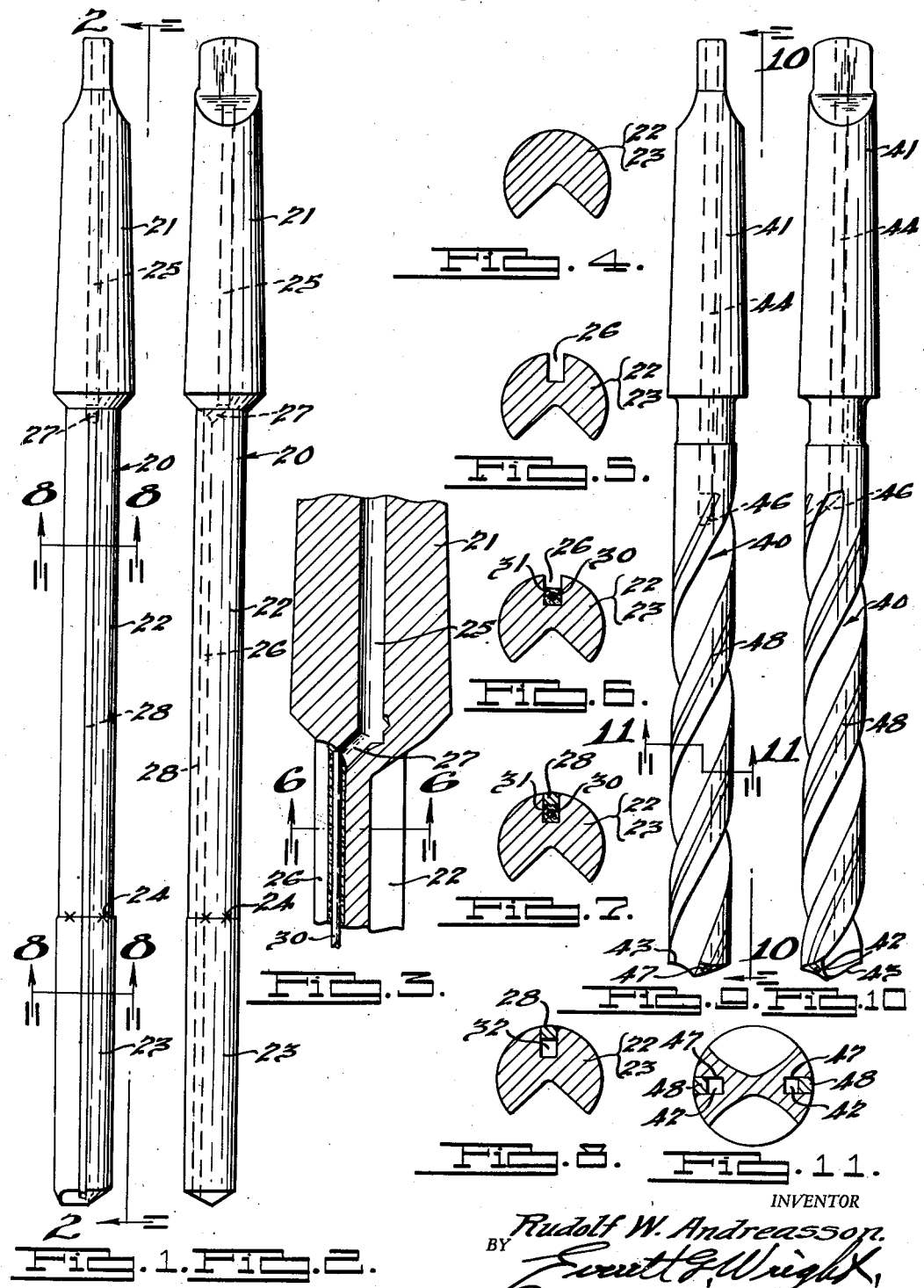
INVENTOR
Rudolf W. Andreasson.
BY Everett G. Wright,
ATTORNEY Patented Mar. 16, 1943

2,314,189

UNITED STATES PATENT OFFICE 2,314,189

METHOD OF MANUFACTURING METAL CUTTING TOOLS

Rudolf W. Andreasson, Detroit, Mich.

Application September 20, 1941, Serial No. 411,650

2 Claims. (Cl. 76—108)

This invention relates to metal cutting tools such as drills and the like and in particular to a method and means for providing a fluid passage therethrough.

In gun drills and twist drills it is customary to provide a fluid passage longitudinally thereof through which cutting compound, lubricant and coolant is forced under pressure to the working end of the cutting tip. In other types of metal cutting tools fluid passages are provided for like purposes. Although the invention may be applied to various types of metal cutting tools having fluid passages therethrough, inasmuch as the invention is most applicable to gun drills and twist drills, it will be described with particular reference thereto.

In long gun drills and twist drills and particularly in small diameter gun drills and twist drills, it is extremely difficult and sometimes impossible to provide long longitudinal bores therethrough because the limited diameter of the stock available limits the diameter of the hole to be bored. Accordingly, long gun drills are oftentimes constructed of a solid shank drilled axially to communicate with a hollow shaft brazed or welded thereto, and onto the end of said shaft is brazed or welded a cutting tip axially bored to communicate with the hollow shaft, thus providing a continuous fluid passage from the top of the shank to the extreme end of the cutting tip. Heretofore, no fluid passage has been possible axially through twist drills of small diameters and long lengths because of lack of stock through which to drill or because of the impracticability of drilling long small diameter holes.

With the foregoing in view, the primary object of the invention is to provide a gun drill, twist drill or the like having an inexpensive and readily formed fluid passage from the top of the shank to the cutting tip thereof.

Another object of the invention is to provide an inexpensive and facile method for forming a fluid passage from the upper end of the shank to the cutting tip of long and small diameter gun and twist drills.

Another object of the invention is to provide a simple, effective and inexpensive method for providing long or tortuous fluid passage through metal cutting tools and the like to the cutting tip or face thereof.

Other objects of the invention will become apparent by reference to the following detailed description taken in connection with the accompanying drawing, in which:

Fig. 1 is a side elevational view of a gun drill embodying the invention.

Fig. 2 is a side elevational view of the gun drill disclosed in Fig. 1 taken on the line 2—2 of Fig. 1.

Fig. 3 is an enlarged fragmentary longitudinal sectional view of the gun drill disclosed in Figs. 1 and 2 bored, milled and prepared for brazing.

Fig. 4 is a cross sectional view of the shaft and cutting tip of the gun drill disclosed in Fig. 1 before milling.

Fig. 5 is a cross sectional view of the gun drill shaft and cutting tip having a longitudinal slot milled therein.

Fig. 6 is a cross sectional view of the gun drill shaft and cutting tip taken on the line 6—6 of Fig. 3 showing a pull wire in the bottom of the milled slot therein, packed and ready for brazing.

Fig. 7 is a cross sectional view of the gun drill shaft and cutting tip having the top portion of the milled slot therein brazed, the pull wire and packing not yet removed.

Fig. 8 is a cross sectional view taken on the lines 8—8 of Fig. 1 showing the completed gun drill shaft and cutting tip.

Fig. 9 is a side elevational view of a twist drill embodying the invention.

Fig. 10 is a side elevational view of the twist drill disclosed in Fig. 9 taken on the line 10—10 of Fig. 9.

Fig. 11 is an enlarged cross sectional view of the twist drill disclosed in Figs. 9 and 10 taken on the line 11—11 of Fig. 9.

Referring now to the drawing wherein like numerals refer to like and corresponding parts throughout the several views, the illustrative embodiment of the invention disclosed in Figs. 1 to 8 inclusive comprises a gun drill generally designated by the numeral 20 having a tapered shank 21, a solid V-shaped shaft 22 preferably integral with the said tapered shank 21, and a hardened steel V-shaped cutting tip 23 butt welded to the bottom of the said shaft 22 as indicated by the reference numeral 24 in Figs. 1 and 2.

The tapered shank 21 of the gun drill 20 is preferably provided with an axial bore 25 and the said shaft 22 and cutting tip 23 have a longitudinal slot 26 milled therein. A diagonal bore 27 provides a passage communicating between the axial bore 25 in the tapered shank 21 and the upper end of the slot 26 formed in the said shaft 22. The top of the said slot 26 is filled with brass or the like 28 as indicated in Figs. 1, 2 and 8 whereby to provide a continuous fluid passage from the top of the shank 21 of the gun drill 20 to the working end of the cutting tip 23.

Referring now particularly to Figs. 3 to 8 inclusive, after the solid shaft 22 and cutting tip 23 indicated in Fig. 4 are milled to provide a longitudinal slot 26 therein as indicated in Fig. 5, a pull wire 30 is positioned in the bottom of the slot 26, and the bottom of the said slot 26 is packed with a forming or moulding material such as carbon or a carbon-graphite compound 31 which will not harden during brazing, the said packing 31 extending above the pull wire 30 as indicated in Figs. 3 and 6. The upper portion of the longitudinal slot 26 is then brazed as indicated in Fig. 7 and, after the brazing material 28 has set, the pull wire 30 which protrudes below the cutting tip 23 is pulled out from the bottom of the slot 26 carrying with it the great majority of the forming or moulding compound 31 employed. Any moulding compound 31 which remains in the completed fluid passage 32 is blown or washed therefrom. Inasmuch as a wide range of forming or moulding compounds 31 may be employed as packing, it is obvious that the invention is not limited to the particular material or compounds mentioned, it being essential only that the material employed for packing serves as a base form for brazing, does not harden as a result of the heat transferred thereto during brazing, and is of such a nature as to mobilize the pull wire or rod 30 with respect to the complete drill. The carbon-graphite compound preferably employed acts as thousands of infinitesimal ball bearings which mobilize the pull wire with respect to the drill and admit of its being easily withdrawn from the fluid passage after brazing. After brazing, the top of the brass or other filler material 28 is smoothed by grinding or polishing or both.

Figs. 9 to 11 inclusive show a twist drill 40 having a tapered shank 41 and provided with a tortuous fluid passage 42 extending from the cutting tip 43 up the outside face of the twisted shaft of the said twist drill 40 and communicating with an axial bore 44 through the tapered shank 41 by means of a diagonal bore 46. The said tortuous fluid passage 42 comprises a milled slot 47 having its top portion filled with brass or other suitable material 48 in a like and similar manner to the method hereinbefore described in connection with the gun drill and method of providing a longitudinal fluid passage therethrough shown in Figs. 1 to 8 inclusive.

It is important that the bridging over or filling of the top of the slot 26 and the top of the slot 47 be accomplished with a metal 28 and 48 respectively that has a melting point sufficiently below the melting point of steel to avoid deleterious annealing of the cutting portion of a metal cutting tool.

Although but two embodiments of the invention and a single method of practicing the invention have been disclosed and described in detail, it is obvious that many changes may be made in the size, shape, arrangement and detail of the elements of the invention and in the method of practicing the same without departing from the spirit of the invention as defined by the appended claims.

I claim:

1. The method of providing a fluid supply passage in cutting tools comprising the steps of milling a slot in the surface of said tool, disposing a pull wire in the base of said slot, mobilizing the said pull wire by filling the base of said slot up to and over said pull wire with a carbon-graphite forming compound not hardenable at the temperature developed by filling the upper portion of said slot with a bridging material molten at a temperature sufficiently low to avoid deleterious annealing of the cutting edge of the cutting tool, and then removing said pull wire from the base of said slot.

2. In the manufacture of an oil hole drill including the steps of longitudinally grooving a blank, placing a pull wire in the bottom of the groove, filling the outer part of the groove with metal in fixed relation to the blank and then removing the pull wire, the step of mobilizing the pull wire for removal from the blank after the application of said metal comprising providing the pull wire while in the bottom of the groove with a covering of granular carbon-graphite material the grains of which are each movable relative to each other whereby to form an antifriction support for said wire in said groove.

RUDOLF W. ANDREASSON.